United States Patent
Ogi et al.

(10) Patent No.: US 9,473,058 B2
(45) Date of Patent: Oct. 18, 2016

(54) MOTOR CONTROL DEVICE

(71) Applicant: DENSO CORPORATION, Kariya, Aichi-pref. (JP)

(72) Inventors: Yosuke Ogi, Okazaki (JP); Daisuke Kobayashi, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/854,575

(22) Filed: Sep. 15, 2015

(65) Prior Publication Data

US 2016/0079900 A1 Mar. 17, 2016

(30) Foreign Application Priority Data

Sep. 16, 2014 (JP) ................. 2014-187600

(51) Int. Cl.
*H02P 21/00* (2016.01)
*H02P 21/05* (2006.01)

(52) U.S. Cl.
CPC ........... *H02P 21/0035* (2013.01); *H02P 21/05* (2013.01); *H02P 21/22* (2016.02)

(58) Field of Classification Search
USPC .................. 318/400.02, 568.22, 568.19, 815
See application file for complete search history.

(56) References Cited

U.S. PATENT DOCUMENTS

| | | | |
|---|---|---|---|
| 4,847,743 A | 7/1989 | Kamiyama | |
| 9,007,004 B2 * | 4/2015 | Hunter | H02P 21/0003 318/400.02 |
| 2002/0060548 A1 * | 5/2002 | Iwaji | H02P 6/085 318/727 |
| 2004/0104697 A1 | 6/2004 | Suzuki | |
| 2004/0232865 A1 | 11/2004 | Suzuki | |
| 2008/0069547 A1 | 3/2008 | Jiang | |
| 2009/0284195 A1 * | 11/2009 | Gallegos-Lopez | B60L 15/025 318/400.02 |
| 2012/0139461 A1 | 6/2012 | Suzuki et al. | |
| 2012/0205187 A1 * | 8/2012 | Izutani | B62D 5/0481 180/446 |
| 2012/0303218 A1 * | 11/2012 | Tamura | B62D 1/02 701/41 |
| 2014/0265954 A1 * | 9/2014 | Kobayashi | B62D 5/046 318/400.02 |

FOREIGN PATENT DOCUMENTS

| | | |
|---|---|---|
| JP | 2004-023843 A | 1/2004 |
| JP | 2009-220665 A | 10/2009 |

* cited by examiner

*Primary Examiner* — Shawki S Ismail
*Assistant Examiner* — Jorge L Carrasquillo
(74) *Attorney, Agent, or Firm* — Knobbe, Martens, Olson & Bear, LLP

(57) ABSTRACT

A motor control device for controlling a multiphase brushless motor in a vector control manner includes: a current command value generation unit that generates q-axis and d-axis current command values; a controller that calculates q-axis and d-axis voltage command values; a saturation guard unit that corrects the q-axis or d-axis voltage command value to set a magnitude of a voltage vector of the q-axis or d-axis voltage command value to be equal to or smaller than a predetermined voltage guard value; and a current command value limiting unit that limits the q-axis or d-axis current command value using a current limit gain and a current guard value, which are calculated based on a voltage saturation amount as the magnitude of the voltage vector of the q-axis or d-axis voltage command value corrected by the saturation guard unit.

4 Claims, 10 Drawing Sheets

MOTOR CONTROL DEVICE

CROSS REFERENCE TO RELATED APPLICATIONS

This application is based on Japanese Patent Application No. 2014-187600 filed on Sep. 16, 2014, the disclosure of which is incorporated herein by reference.

TECHNICAL FIELD

The present disclosure relates to a motor control device for controlling the driving of a motor.

BACKGROUND

Up to now, in a current feedback control of a brushless motor, a technique in which a current command limit value is corrected so as not to saturate a voltage, and an abnormal noise or vibration of the motor is suppressed has been known.

For example, in the motor control device disclosed in Patent Literature 1, a voltage saturation is calculated according to a duty value of a PWM, and the current command limit value to achieve the duty of 100% is calculated on the basis of the voltage saturation, whereby the current command value is suppressed to prevent the saturation of the voltage.

In the device of Patent Literature 1, under the assumption that there is a proportional relationship between a motor terminal voltage and a duty value of the PWM, the voltage saturation is obtained according to the duty value. However, when three-phase modulation or two-phase modulation is performed in the generation of a PWM signal to be output to an inverter, because the duty value has no proportional relationship with an actual motor terminal voltage, a current limit cannot be performed with the use of the device of Patent Literature 1.

[Patent Literature 1] JP-2008-79387 A (corresponding to US 2008/0069547)

SUMMARY

It is an object of the present disclosure to provide a motor control device that appropriately suppresses the abnormal noise or the vibration caused by the voltage saturation even when the three-phase modulation or the two-phase modulation is performed.

According to an aspect of the present disclosure, a motor control device for controlling energization of a multiphase brushless motor in a vector control manner, includes: a current command value generation unit that generates a q-axis current command value and a d-axis current command value; a controller that calculates a q-axis voltage command value and a d-axis voltage command value under a feedback control of the q-axis current command value and the d-axis current command value; a saturation guard unit that corrects at least one of the q-axis voltage command value and the d-axis voltage command value to set a magnitude of a voltage vector of the q-axis voltage command value and the d-axis voltage command value to be equal to or smaller than a predetermined voltage guard value; and a current command value limiting unit that limits at least one of the q-axis current command value and the d-axis current command value using one of a current limit gain and a current guard value, which are calculated based on a voltage saturation amount as the magnitude of the voltage vector of the q-axis voltage command value and the d-axis voltage command value corrected by the saturation guard unit.

The motor control device calculates the voltage saturation amount according to the q-axis voltage command value and the d-axis voltage command value corrected by the saturation guard unit in a stage prior to the PWM conversion. For that reason, the motor control device can correctly calculate the voltage saturation amount even when the three-phase modulation or the two-phase modulation is performed as compared with the conventional art of PTL 1 which obtains the voltage saturation amount according to the duty value of the PWM. The motor control device can appropriately suppress the abnormal noise or the vibration with the appropriate limitation of the q-axis current command value or the d-axis current command value by using the current limit gain or the current guard value calculated on the basis of the voltage saturation amount.

In the calculation for limiting the current command value, because a value obtained from a parameter such as an equipment constant is not used, there is no need to finely set the parameter for each model of applied motors or inverters. Therefore, the number of design steps can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, plural embodiments of a motor control device according to the present disclosure will be described with reference to the accompanying drawings.

Figure 1:
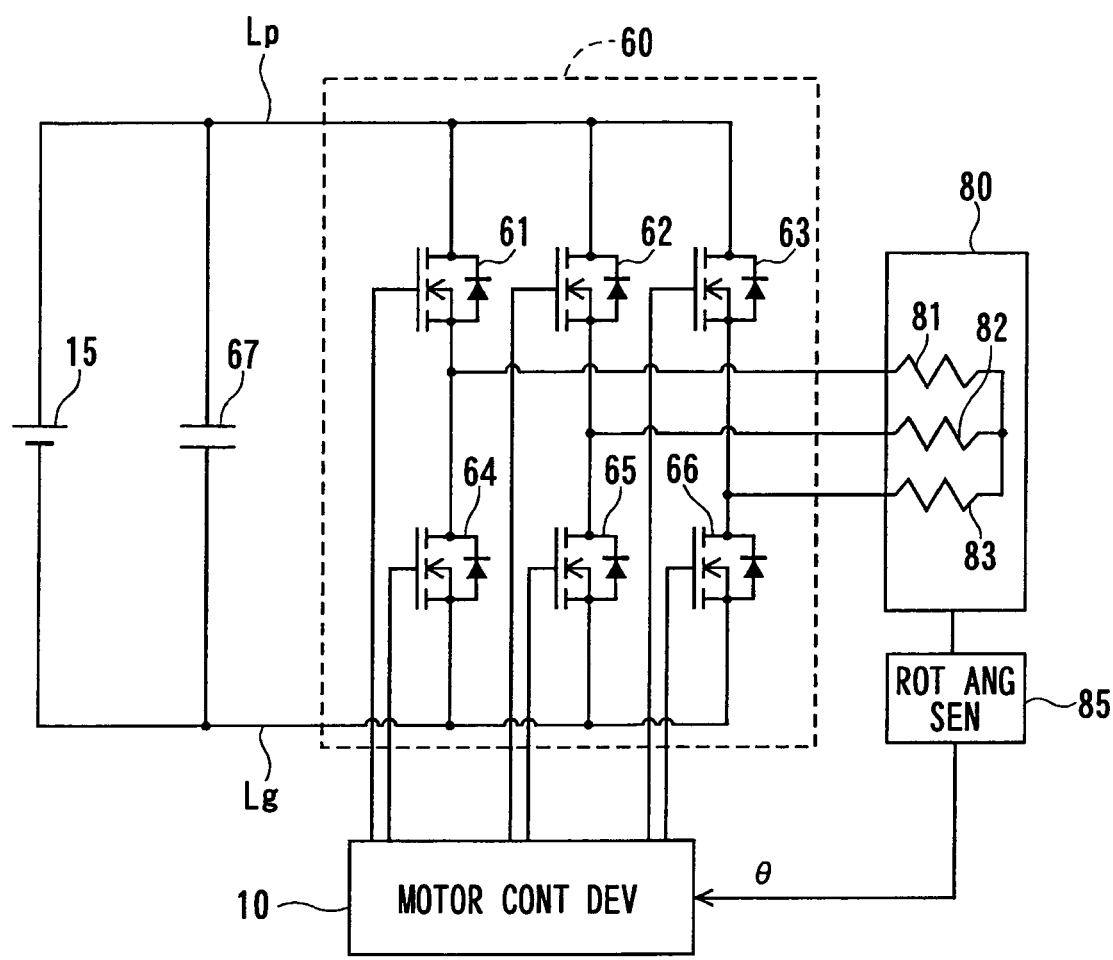
FIG. 1 is a schematic configuration diagram of a motor drive system employing a motor control device according to an embodiment.

As illustrated in FIG. 1, a motor control device 10 according to an embodiment of the present disclosure executes the switching operation of an inverter 60 to control the energization of a multiphase brushless motor (hereinafter called "motor") 80. The motor 80 according to this embodiment is a three-phase brushless motor having a three-phase winding set 81, 82, and 83, and used as a steering assist motor for assisting steering by a driver, for example, in an electric power steering device for a vehicle. A rotor rotation angle of the motor 80, which is detected by a rotation angle sensor 85, is transformed into an electric angle θ, and input to the motor control device 10.

The inverter 60 has six switching elements 61 to 66 connected in a bridge circuit, transforms a DC power of a battery 15 into a three-phase AC power under a PWM control, and supplies the transformed power to the motor 80. In this embodiment, a MOSFET, that is, a metal oxide semiconductor field effect transistor is used as the switching elements 61 to 66. In another embodiment, a field effect transistor other than the MOSFET or an IGBT may be used.

The inverter 60 is connected to a positive side of the battery 15 through a power line Lp, and connected to a negative side of the battery 15 through a ground line Lg. An input side of the inverter 60 is provided with a capacitor 67 for smoothing the pulsation of an input voltage.

The motor control device 10 includes a microcomputer and a driver circuit (pre-driver) not shown. The motor control device 10 calculates a voltage command value on the basis of a torque signal input from an external and a feedback signal of a current and an electric angle of the motor 80 by means of a controller, and transforms the voltage command value into a PWM signal to output the PWM signal to respective gates of the switching elements 61 to 66 in the inverter 60.

Incidentally, when a magnitude of a voltage vector of the voltage command value calculated by the controller exceeds a maximum allowable value, "voltage saturation" is produced. When the voltage saturation is produced, the control by the controller is disabled to cause the abnormal noise and the vibration of the motor 80.

Under the circumstances, the motor control device 10 according to the embodiment of the present disclosure aims at suppressing the abnormal noise and the vibration with the limitation of the current command value so as not to produce the voltage saturation under the control. Hereinafter, a motor control device according to a first embodiment is denoted by reference numeral "101", a motor control device according to a second embodiment is denoted by reference numeral "102", and a specific configuration for limiting the current command value will be described for each of the embodiments.

First Embodiment

A motor control device according to a first embodiment will be described with reference to FIGS. 2 to 6.

Figure 2:
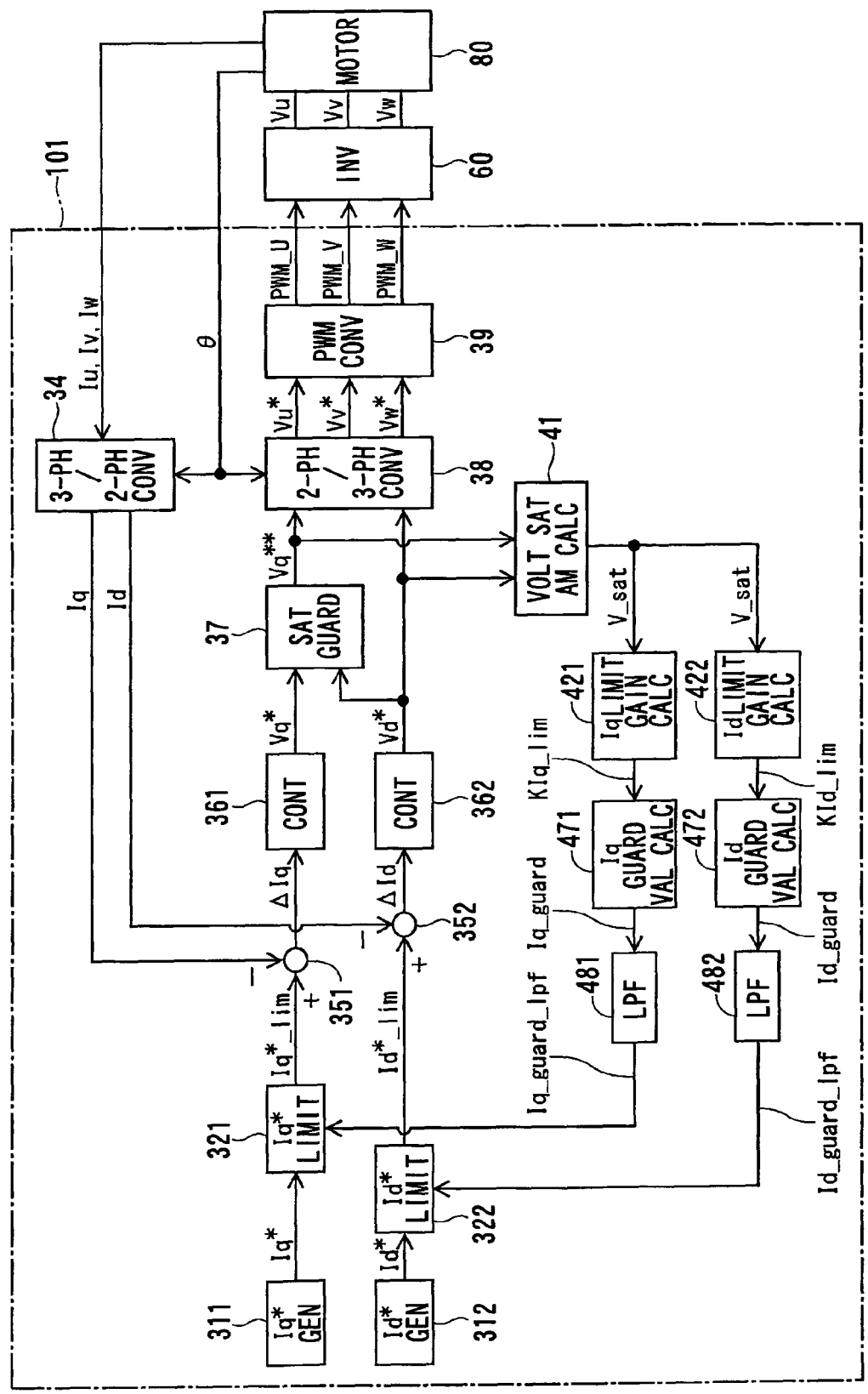
FIG. 2 is a control block diagram of a motor control device according to a first embodiment.

First, a control block of a motor control device 101 is illustrated in FIG. 2. The motor control device 101 calculates a voltage command value to be supplied to a motor 80 under a known vector control for performing a coordinate transformation between a fixed coordinate system (three phase) and a rotating coordinate system (two phase). Hereinafter, in the present specification, when a dq-axis current and a dq-axis voltage of the rotating coordinate system are described, in principle, a q-axis current and a q-axis voltage which are torque components will be first described, and a d-axis current and a d-axis voltage which are exciting components will be then described. In reference signs of corresponding control blocks, "1" is added to an end of a code of the control block for the q-axis current, and "0" is added to an end of a code of the control block for the d-axis current for distinction between the q-axis current and the d-axis current.

Further, the configuration and the operation of the control bock for the q-axis current substantially correspond to those of the control block for the d-axis current, and therefore a repetitive description will be appropriately omitted.

A q-axis current command value generation unit 311 and a d-axis current command value generation unit 312 generate a q-axis current command value Iq* and a d-axis current command value Id*, respectively, on the basis of a torque signal from a torque sensor not shown. The positive and the negative of the q-axis current Iq are defined according to a rotation direction of the motor 80, that is, a steering direction in the case of an electric power steering device, such that, for example, the q-axis current Iq is positive when steering rightward, and negative when steering leftward.

As will be described later, a q-axis current command value limiting unit 321 and a d-axis current command value limiting unit 322 limit the q-axis current command value Iq* and the d-axis current command value Id* with the use of filtered values (hereinafter called "filtered values") Iq_guard_Ipf and Id_guard_Ipf of current guard values input from LPFs 481 and 482, and output a q-axis current command limit value Iq*_lim and a d-axis current command limit value Id*_lim.

Figure 3:
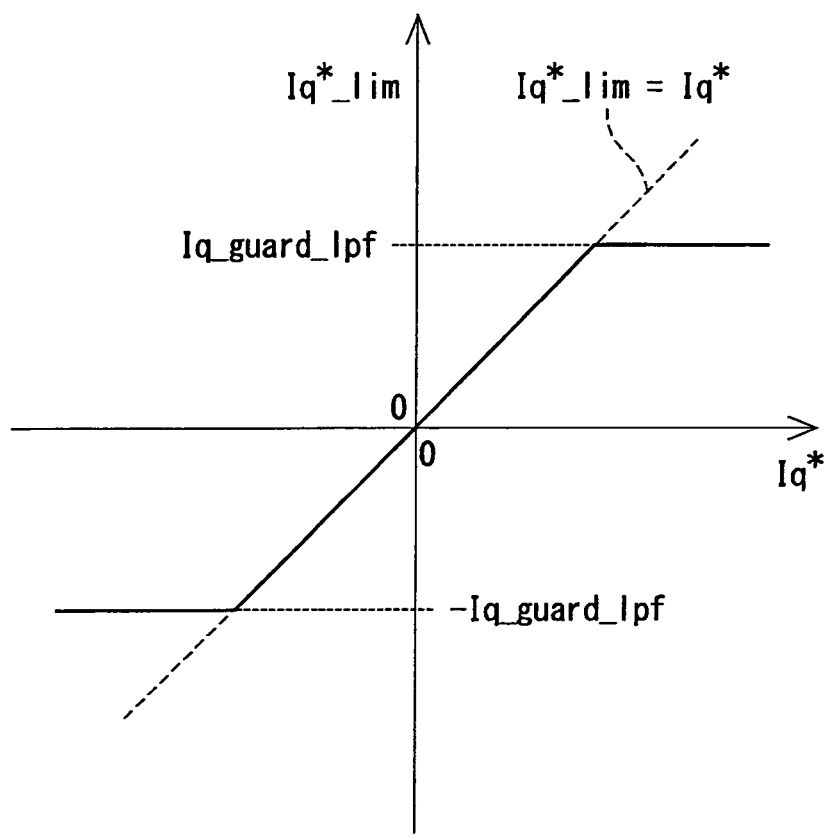
FIG. 3 is a map illustrating the limitation of a current command value.

In detail, as shown in a map of FIG. 3 exemplifying the q-axis current command value, the filtered value of the current guard value has its own value (positive current guard value) Iq_guard_Ipf limiting "maximum value in a positive region", and a value inverted in positive and negative (negative current guard value) −Iq_guard_Ipf limiting "minimum value in a negative region".

In other words, in a region where the q-axis current command value Iq* exceeds the positive current guard value Iq_guard_Ipf, the positive current guard value Iq_guard_Ipf is set as the q-axis current command limit value Iq*_lim. In a region where the q-axis current command value Iq* falls below the negative current guard value −Iq_guard_Ipf, the negative current guard value −Iq_guard_Ipf is set as the q-axis current command limit value Iq*_lim. On the other hand, in a region where the q-axis current command value Iq* falls within the positive and negative current guard value, the q-axis current command value Iq* is set as the q-axis current command limit value Iq*_lim as it is without any limitation.

The feature of this embodiment over the conventional art resides in that "on the basis of what information the current guard value is obtained", which will be described later.

A three-phase to two-phase conversion unit 34, current subtractors 351, 352, and controllers 361, 362 are configured to perform a known current feedback control.

The three-phase to two-phase conversion unit 34 acquires three-phase currents Iu, Iv, and Iw from a current sensor not shown which is disposed within the inverter 60 (indicated by "INV" in FIG. 2), or in a current pathway from the inverter 60 to the motor 80. The three-phase to two-phase conversion unit 34 may detect two-phase currents among the three-phase currents, and calculate the remaining one-phase current under a Kirchhoff's law. The three-phase to two-phase conversion unit 34 acquires an electric angle θ of the motor 80 from the rotation angle sensor 85, and three-phase to two-phase transforms the three-phase currents Iu, Iv, and Iw into the q-axis current Iq and the d-axis current Id on the basis of the electric angle θ.

The current subtractors 351 and 352 subtract the q-axis current Iq and the d-axis current Id fed back from the three-phase to two-phase conversion unit 34 from the q-axis current command limit value Iq*_lim and the d-axis current command limit value Id*_lim to calculate a q-axis current deviation ΔIq and a d-axis current deviation ΔId, respectively.

The controllers 361 and 362 calculate a q-axis voltage command value Vq* and a d-axis voltage command value Vd* typically by means of a PI (proportional integral) control operation, respectively, so that the q-axis current deviation ΔIq and the d-axis current deviation ΔId converge to zero. In another embodiment, D (differential) control operation may be further performed.

When the magnitude ($=\sqrt{(Vq^{*2}+Vd^{*2})}$) of the voltage vector of the q-axis voltage command value Vq* and the d-axis voltage command value Vd* exceeds a predetermined voltage guard value set, for example, with reference to a supply voltage, a saturation guard unit 37 corrects at least one of the q-axis voltage command value Vq* and the d-axis voltage command value Vd* to be reduced in absolute value so that the magnitude of the voltage vector becomes equal to or smaller than the voltage guard value.

In this embodiment, the saturation guard unit 37 corrects only the q-axis voltage command value Vq* which is a torque component, and outputs the d-axis voltage command value Vd*, which is an exciting component, as it is. Hereinafter, the q-axis voltage command value corrected by the saturation guard unit 37 is indicated by symbol "Vq". The "q-axis voltage command value Vq corrected by the saturation guard unit 37" may be abbreviated to "q-axis voltage command value Vq** after saturation guard".

Figure 4:
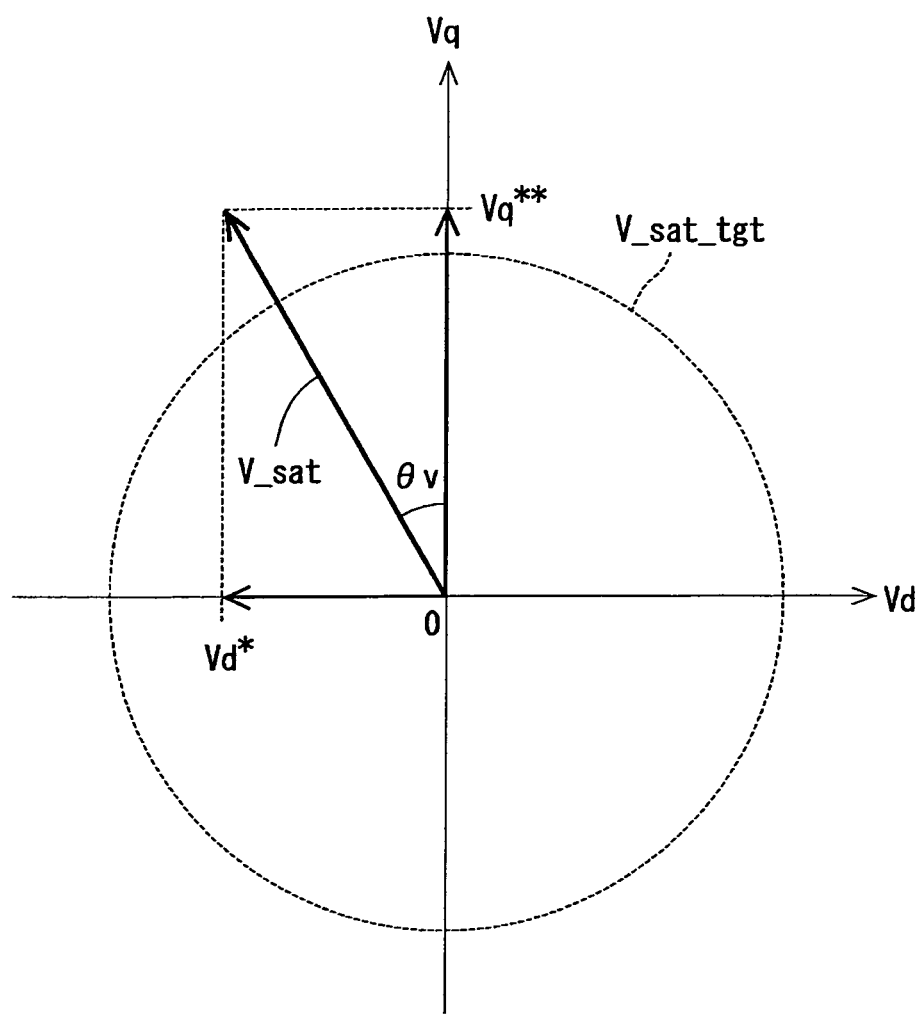
FIG. 4 is a diagram illustrating a voltage vector of a voltage command value.

The q-axis voltage command value Vq** after saturation guard and the d-axis voltage command value Vd* are represented in dq-axis voltage coordinates as illustrated in FIG. 4.

A two-phase to three-phase conversion unit 38 two-phase to three-phase transforms the q-axis voltage command value Vq** after saturation guard and the d-axis voltage command value Vd* into three-phase voltage command values Vu*, Vv*, and Vw* on the basis of the electric angle θ, and outputs the transformed values to the inverter 60.

A PWM conversion unit 39 compares duty signals into which the three-phase voltage command values Vu*, Vv*, and Vw* are converted with carriers, and transforms the duty signals into PWM signals PWM_U, PWM_V, and PWM_W.

In that situation, for example, for the purpose of improving a voltage utilization rate, control may be performed to increase or decrease the duty values of one or more phases by three-phase modulation or two-phase modulation. The three-phase modulation and the two-phase modulation are known techniques disclosed in, for example, Japanese Patent No. 2577738 and JP-A-2012-125022, and therefore their detailed description will be omitted.

The on/off operation of the switching elements 61 to 66 in the inverter 60 is performed on the basis of the PWM signal to generate desired three-phase AC voltages Vu, Vv, and Vw. The driving of the motor 80 is controlled to output a required torque with the application of the three-phase AC voltages Vu, Vv, and Vw to the motor 80.

Figure 6:
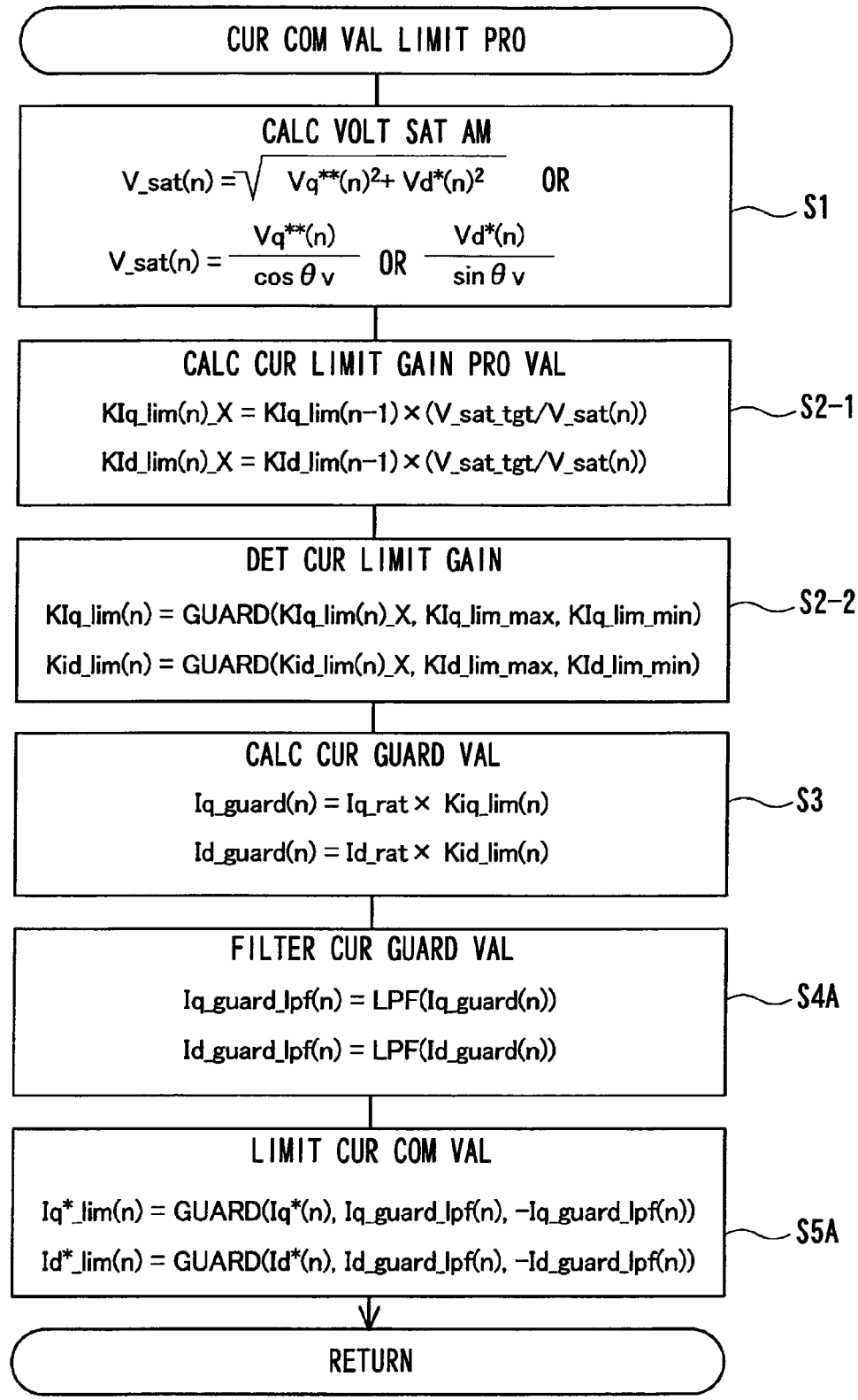
FIG. 6 is a flowchart of a current command value limiting process according to the first embodiment.

Subsequently, a description will be given of a voltage saturation amount calculation unit 41, current limit gain calculation units 421, 422, current guard value calculation units 471, 472, and LPFs 481, 482, which are characteristic configurations of the first embodiment. Now, an outline of the functions of the respective blocks will be described, and the details of calculation contents will be described later with reference to a flowchart (FIG. 6).

The voltage saturation amount calculation unit 41 calculates a voltage saturation amount V_sat which is the magnitude of the voltage vector of the q-axis voltage command value Vq** after saturation guard and the d-axis voltage command value Vd*.

The current limit gain calculation units 421 and 422 calculate a q-axis current limit gain KIq_lim and a d-axis current limit gain KId_lim on the basis of the voltage saturation amount V_sat, respectively.

Figure 5:
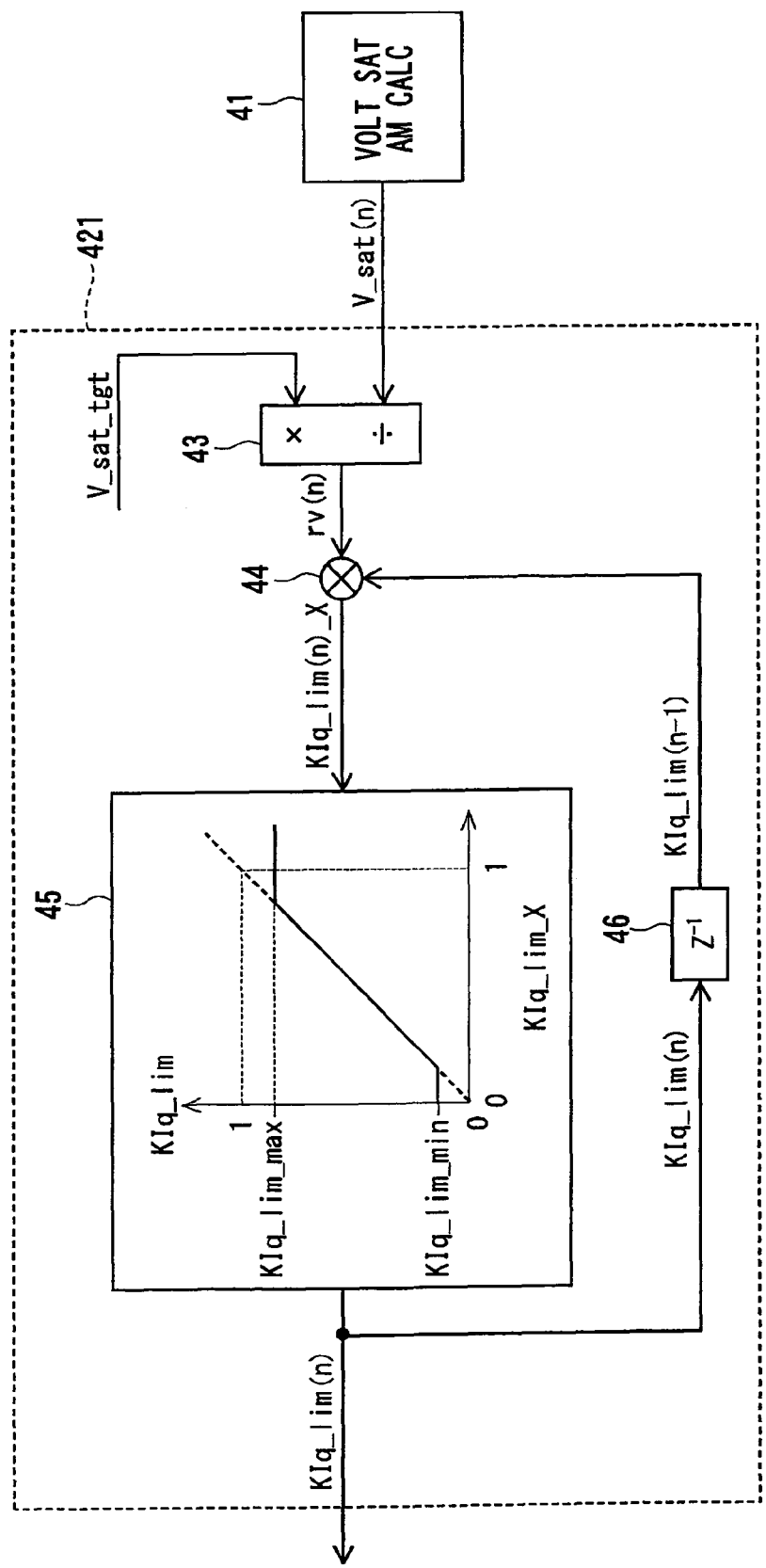
FIG. 5 is a block diagram illustrating the details of a current limit gain calculation unit in FIG. 2.

Referring to FIG. 5, the detailed configuration of the q-axis current limit gain calculation unit 421 will be described. The same is applied to the d-axis current limit gain calculation unit 422. In the description of FIG. 5, because of matching with a flowchart (FIG. 6) to be described later, in a series of arithmetic process, a calculated value (present value) in the present processing is represented with (n), and a calculated value (previous value) in the previous processing is represented with (n−1). On the other hand, in FIG. 2 focusing the description of an outline of the configuration, the recitation of (n) is omitted.

A ratio calculator 43 acquires the present value V_sat(n) of the voltage saturation amount from the voltage saturation amount calculation unit 41, and calculates a ratio rv(n) obtained by dividing a target voltage saturation amount V_sat_tgt stored in advance by the present value V_sat(n) of the voltage saturation amount.

As illustrated in FIG. 4, when the voltage saturation amount V_sat(n) becomes larger than the target voltage saturation amount V_sat_tgt, the ratio rv(n) becomes smaller than 1. On the other hand, when the voltage saturation amount V_sat(n) is smaller than the target voltage saturation amount V_sat_tgt, the ratio rv(n) becomes larger than 1.

A multiplier 44 multiplies a previous value KIq_lim(n−1) of the q-axis current limit gain which is input from a delay element 46 by the ratio rv(n), and calculates the present "provisional value" KIq_lim(n)_X of the q-axis current limit gain. In other words, the multiplier 44 sets a value obtained by correcting the present value V_sat(n) of the voltage saturation amount to match the target voltage saturation amount V_sat_tgt with reference to the previous value KIq_lim(n−1), as the present provisional value of the current limit gain.

A gain determination unit 45 limits a maximum value to KIq_lim_max, and limits a minimum value to KIq_lim_min with respect to the q-axis current limit gain provisional value KIq_lim(n)_X, and outputs a q-axis current limit gain determined value KIq_lim(n). For example, the q-axis current limit gain maximum value KIq_lim_max is set to a value slightly smaller than 1, and the q-axis current limit gain minimum value KIq_lim_min is set to a value slightly larger than 0.

Returning to FIG. 2, the current guard value calculation units 471 and 472 multiply rated currents of the q-axis current and the d-axis current by current limit gain determined values KIq_lim and KId_lim, respectively, and calculate a q-axis current guard value Iq_guard and a d-axis current guard value Id_guard, respectively.

The low pass filters (hereinafter called "LPF") 481 and 482 are typically first-order lag filters, and remove frequency components in a predetermined range of the q-axis current guard value Iq_guard and the d-axis current guard value Id_guard, specifically, high frequency components equal to or higher than the predetermined frequency. As a result, the noise may be removed, or an output variation caused by a sudden change in input is suppressed.

This embodiment aims at mainly suppressing a sudden change in the current guard values Iq_guard and Id_guard relative to the current command values Iq* and Id*, and realizing the control stability. With respect to a phase lag caused by the filter, a constant is set to the degree that does not affect a control response.

The filtered value Iq_guard_lpf of the q-axis current guard value and the filtered value Id_guard_lpf of the d-axis current guard value are input to the current command value limiting units 321 and 322, respectively.

As described above, the feature of the first embodiment resides in that the current command values Iq* and Id* are limited with the use of "current guard values Iq_guard and Id_guard" calculated on the basis of "voltage saturation amount V_sat which is the magnitude of the voltage vector of the q-axis voltage command value Vq** after saturation guard and the d-axis voltage command value Vd*".

Subsequently, a current command value limiting process to be executed by the motor control device 101 will be described with reference to a flowchart of FIG. 6. In the description of the flowchart, symbol "S" means a step. In this example, S3 and S4A and S5A in which "A" is added to the end are steps specific to the first embodiment different from a second embodiment to be described later.

The processing routine is repetitively executed in synchronization with a control period of, for example, a controller 36. The present processing is set as n-th processing, a calculated value (present value) in the present processing is denoted by (n), and a calculated value (previous value) in the previous processing is denoted by (n−1).

In S1, the present value V_sat(n) of the voltage saturation amount is calculated on the basis of the q-axis voltage command value Vq** after saturation guard and the d-axis voltage command value Vd* in the voltage saturation amount calculation unit 41. Specifically, square-root of sum of squares may be calculated through Expression (1.1). When a phase angle θv (refer to FIG. 4) is well-known, the square-root of sum of squares may be calculated through Expression (1.2).

[Expression 1]

$$V\_sat(n) = \sqrt{Vq^{**}(n)^2 + Vd^*(n)^2} \quad (1.1)$$

$$V\_sat(n) = \frac{Vq^{**}(n)}{\cos\theta v} \text{ or } \frac{Vd^*(n)}{\sin\theta v} \quad (1.2)$$

S2-1 and S2-2 will be described with reference to FIG. 5 with the inclusion of the q-axis current and the d-axis current in symbols and expressions.

In S2-1, the ratio rv(n) (=V_sat_tgt/V_sat(n)) of the present value V_sat(n) of the voltage saturation amount and the target voltage saturation amount V_sat_tgt is calculated in the ratio calculator 43 of the current limit gain calculation unit 421. Further, the previous values KIq_lim (n−1) and KId_lim (n−1) are multiplied by the ratio rv(n) to calculate the provisional values KIq_lim(n)_X and KId_lim(n)_X of the current limit gain in the multiplier 44. That calculation is represented by Expression (2).

[Expression 2]

$$KIq\_lim(n)\_X = KIq\_lim(n-1) \times \frac{V\_sat\_tgt}{V\_sat(n)} \quad (2)$$

$$KId\_lim(n)\_X = KId\_lim(n-1) \times \frac{V\_sat\_tgt}{V\_sat(n)}$$

In S2-2, the maximum values KIq_lim_max and KId_lim_ max, and the minimum values KIq_lim_min and KId_lim_ min are limited with respect to the provisional values KIq_lim(n)_X and KId_lim(n)_X of the current limit gain, and the determined values KIq_lim(n) and KId_lim(n) of the current limit gain are output in the gain determination unit 45. That calculation is presented by Expression (3). The "GUARD (x, y, z)" on the right side of Expression (3) means a function with x, y, and z as parameters.

[Expression 3]

$$KIq\_lim(n)=GUARD(KIq\_lim(n)\_X, KIq\_lim\_max, KIq\_lim\_min)$$

$$KId\_lim(n)=GUARD(KId\_lim(n)\_X, KId\_lim\ max, KId\_lim\_min) \quad (3)$$

In S3, the rated currents Iq_rat and Id_rat of the q-axis current and the d-axis current are multiplied by the determined values KIq_lim(n) and KId_lim(n) of the current limit gain, respectively, and a q-axis current guard value Iq_guard (n) and a d-axis current guard value Id_guard(n) are calculated in the current guard value calculation units 471 and 472, respectively. That calculation is represented by Expression (4).

[Expression 4]

$$Iq\_guard(n)=Iq\_rat \times KIq\_lim(n)$$

$$Id\_guard(n)=Id\_rat \times KId\_lim(n) \quad (4)$$

In S4A, a filtering process such as first-order lag is performed in the LPFs 481 and 482, and a filter value Iq_guard_lpf(n) of the q-axis current guard value and a filter value Id_guard_lpf(n) of the d-axis current guard value are calculated through Expression (5). The "LPF(x)" on the right side of Expression (5) means an filtered output to the input x.

[Expression 5]

$$Iq\_guard\_lpf(n)=LPF(Iq\_guard(n))$$

$$Id\_guard\_lpf(n)=LPF(Id\_guard(n)) \quad (5)$$

In S5A, the current command values Iq*(n) and Id*(n) are limited with the positive current guard values Iq_guard_lpf (n) and Id_guard_lpf(n) as the maximum values and the negative current guard values −Iq_guard_lpf(n) and −Id_guard_lpf(n) as the minimum values through Expression (6) in the current command value limiting units 321 and 322.

[Expression 6]

$$Iq^*\_lim(n)=GUARD(Iq^*(n), Iq\_guard\_lpf(n), -Iq\_guard\_lpf(n))$$

$$Id^*\_lim(n)=GUARD(Id^*(n), Id\_guard\_lpf(n), -Id\_guard\_lpf(n)) \quad (6)$$

(Comparison) The advantages of the motor control device 101 according to this embodiment will be described as compared with the conventional art disclosed in PTL 1 (JP-A 2008-79387).

Figure 10:
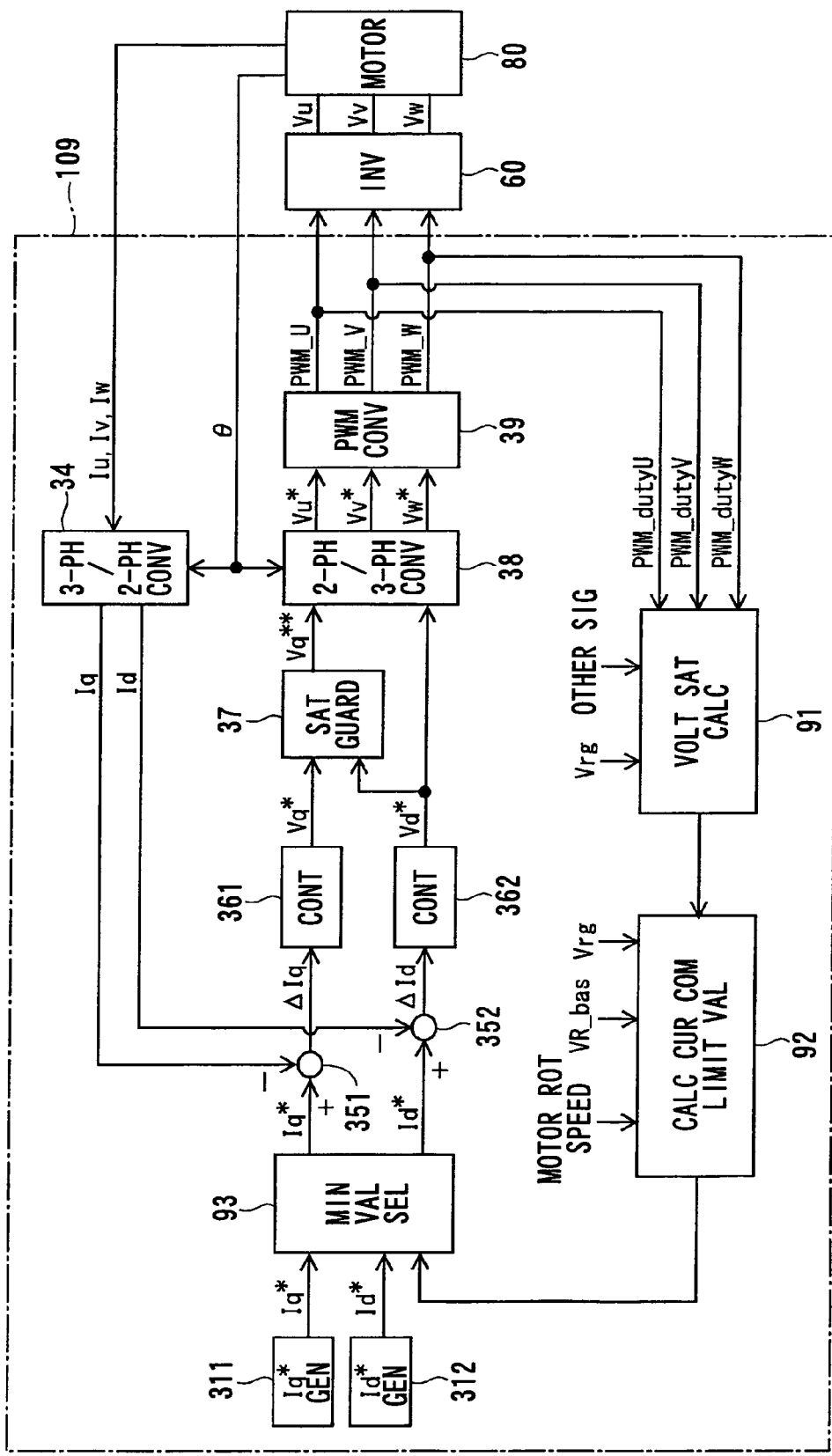
FIG. 10 is a control block diagram of a motor control device in a comparative example.

In a motor control device 109 in a comparative example illustrated in FIG. 10, the configuration of the conventional art in PTL 1 is disclosed according to the control block of the motor control device 101 of this embodiment. Substantially the same configurations as those in this embodiment are denoted by identical symbols. The motor control device 109 in the comparative example is different from the motor control device 101 of this embodiment in that a voltage saturation calculation unit 91, a current command limit value calculation unit 92, and a minimum value selection unit 93 are provided.

The voltage saturation calculation unit 91 calculates a voltage saturation on the basis of duty values PWM_duty U, V, W of the respective phases of the PWM, a supply voltage Vrg, and other signals.

The current command limit value calculation unit 92 calculates a current command limit value on the basis of information such as a voltage saturation, a motor rotation speed, a base voltage VR_bas, and a supply voltage Vrg through map calculation.

The minimum value selection unit 93 compares a current command value calculated on the basis of the torque with a current command limit value calculated by the current command limit value calculation unit 92, and selects and outputs a minimum value.

As described above, in the device of the comparative example, on the assumption that there is a proportional relationship between a motor terminal voltage and the duty value of the PWM, the voltage saturation is obtained according to the respective phase duty values PWM_duty U, V, W. However, when the three-phase modulation or the two-phase modulation is conducted in the generation of the PWM signal, because the duty value has no proportional relationship with the actual motor terminal voltage, the current limit cannot be performed with the use of the device in the comparative example.

On the contrary, in the motor control device 101 of this embodiment, because the voltage saturation amount V_sat is calculated according to the q-axis voltage command value Vq** after the saturation guard and the d-axis voltage command value Vd* in the stage prior to the PWM conversion, the voltage saturation amount V_sat can be correctly calculated even when the three-phase modulation and the two-phase modulation are performed. The current command values Iq* and Id* are appropriately limited with the use of the current guard values Iq_guard and Id_guard calculated on the basis of the voltage saturation amount V_sat whereby the abnormal noise or the vibration can be appropriately suppressed.

When a steering assist motor of the electric power steering device is column-mounted, because the steering assist motor is installed in a place close to a driver, the abnormal noise and the vibration are particularly likely to be problematic. Therefore, the advantages of suppressing the abnormal noise and the vibration according to this embodiment are effectively exerted.

In the calculation for limiting the current command values Iq* and Id*, because a value obtained from a parameter such as an equipment constant is not used, there is no need to finely set the parameter for each model of applied motors 80 or inverters 60. Therefore, the number of design steps can be reduced.

In this embodiment, the LPFs 481 and 482 are disposed after the current guard value calculation units 471 and 472, and the filter values Iq_guard_lpf and Id_guard_lpf of the current guard value are input to the current command value limiting units 321 and 322. With the above configuration, when the current guard values Iq_guard and Id_guard suddenly change, the current command values Iq* and Id* can be prevented from suddenly changing in a region where the absolute values exceed the current guard values Iq_guard and Id_guard, and the control can be stabilized.

Further, when the q-axis current is exemplified, the current limit gain calculation unit 421 according to this embodiment limits the maximum value KIq_lim_max and the minimum value KIq_lim_min of the current limit gain with respect to the provisional value KIq_lim(n)_X of the current limit gain calculated on the basis of the ratio rv(n) of the voltage saturation amount V_sat(n) and the target voltage saturation amount V_sat_tgt, and determines the current limit gain KIq_lim(n). As a result, the determined value KIq_lim(n) of the current limit gain can be more surely prevented from being set to an improper value.

Second Embodiment

Figure 7:
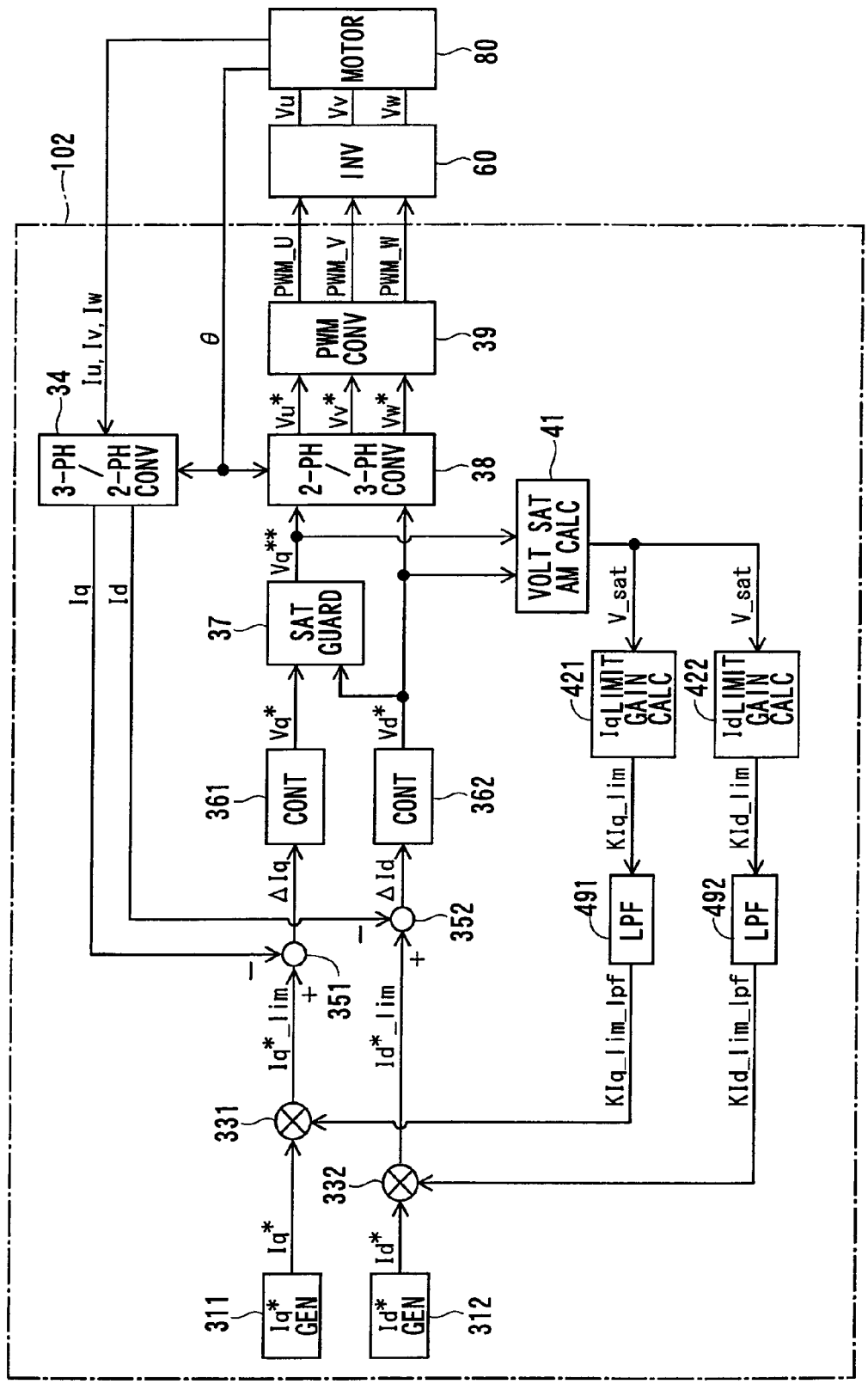
FIG. 7 is a control block diagram of a motor control device according to a second embodiment.

A motor control device according to a second embodiment will be described with reference to a control block diagram of FIG. 7 and a flowchart of FIG. 8. Substantially the same configurations or substantially the same steps as those in the first embodiment are denoted by identical symbols or step symbols, and their description will be omitted.

In a motor control device 102 according to the second embodiment illustrated in FIG. 7, only differences from the motor control device 101 of the first embodiment illustrated in FIG. 2 will be described.

In the motor control device 102, a "current command value limiting unit" includes multipliers 331 and 332. The motor control device 102 does not have the current guard value calculation units 471 and 472 of the first embodiment, and a q-axis current limit gain KIq_lim and a d-axis current limit gain KId_lim calculated by the current limit gain calculation units 421 and 422 are input directly to LPFs 491 and 492.

A q-axis current command value Iq* generated by a q-axis current command value generation unit 311 and a d-axis current command value Id* generated by a d-axis current command value generation unit 312 are multiplied by a filter value KIq_lim_lpf of a q-axis current limit gain and a filter value KId_lim_lpf of a d-axis current limit gain, which are input from the current limit gain calculation units 421 and 422 through the LPFs 491 and 492, by the multipliers 331 and 332, thereby being limited to a q-axis current command limit value Iq*_lim and a d-axis current command limit value Id*_lim, respectively.

In the second embodiment, when the current limit gains KIq_lim and KId_lim suddenly change, all of the regions of the current command values Iq* and Id* are affected by the sudden change of the current limit gains. Therefore, the current limit gains KIq_lim and KId_lim are filtered with the results that the sudden change of the current command values Iq* and Id* can be prevented without exception, and the control can be stabilized.

Figure 8:
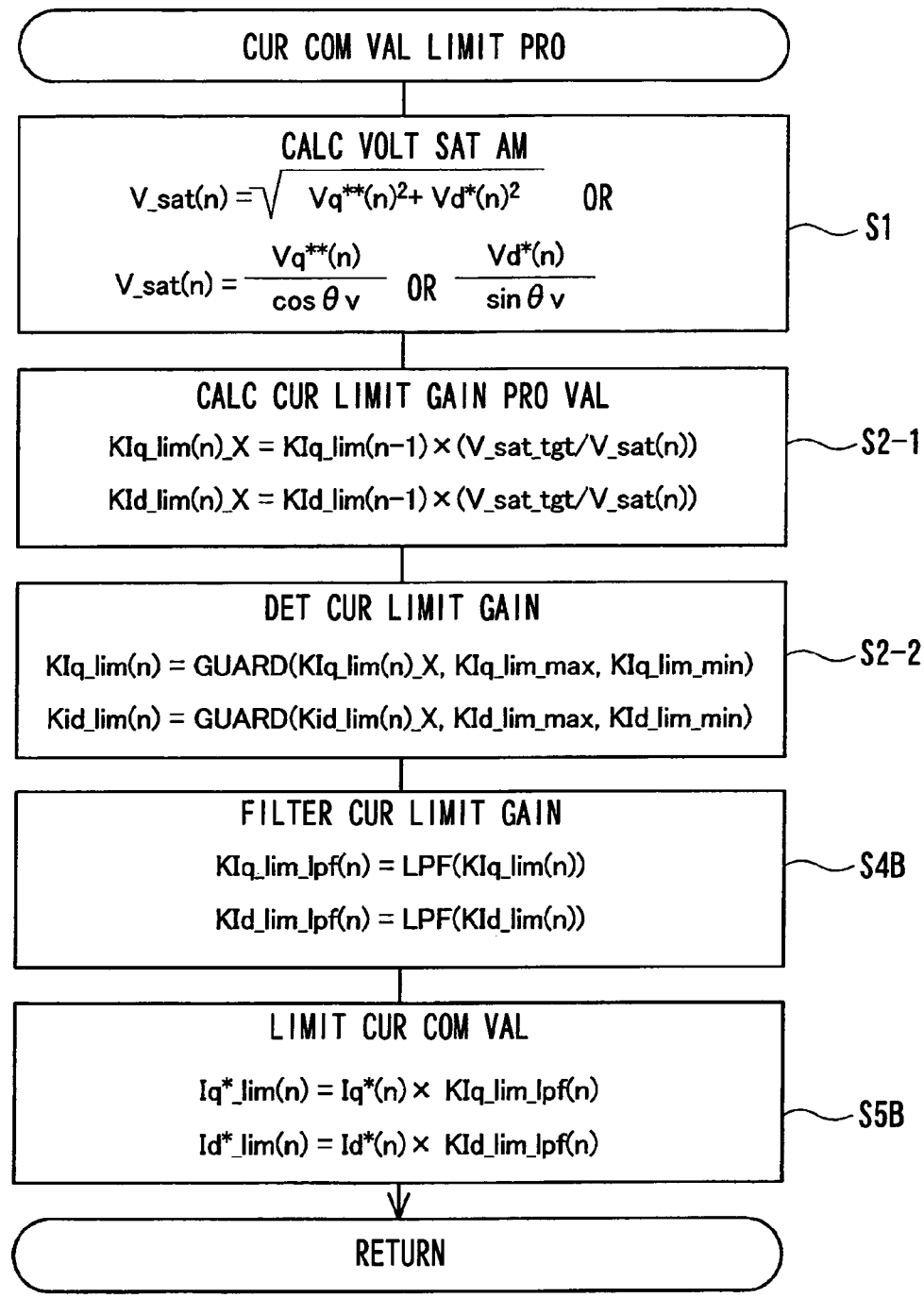
FIG. 8 is a flowchart of a current command value limiting process according to the second embodiment.

As illustrated in FIG. 8, a current command value limiting process according to the second embodiment is identical in S1, S2-1, and S2-2 with the process of the first embodiment (FIG. 6), and does not include S3 of the current guard value calculation. The current command value limiting process of the second embodiment includes S4B and S5B different from S4A and S5A.

In S4B, a filtering process such as first-order lag is performed in the LPFs 491 and 492 to calculate the filter values KIq_lim_lpf(n) and KId_lim_lpf(n) of the q-axis and d-axis current limit gains through Expression (7).

[Expression 7]

$$KIq\_lim\_lpf(n)=LPF(KIq\_lim(n))$$

$$KId\_lim\_lpf(n)=LPF(KId\_lim(n)) \quad (7)$$

In S5B, the current command values Iq*(n) and Id*(n) are limited by the multipliers 331 and 332 through Expression (8).

[Expression 8]

$$Iq^*\_lim(n)=Iq^*(n) \times KIq\_lim\_lpf(n)$$

$$Id^*\_lim(n)=Id^*(n) \times KId\_lim\_lpf(n) \quad (8)$$

As in the first embodiment, the motor control device 102 according to the second embodiment can correctly calculate the voltage saturation amount V_sat even when the three-phase modulation or the two-phase modulation is performed. The motor control device 102 appropriately limits the current command values Iq* and Id* with the use of the current limit gains KIq_lim and KId_lim calculated on the basis of the voltage saturation amount V_sat, thereby being capable of appropriately suppressing the abnormal noise and the vibrations. As compared with the first embodiment, because a step of calculating the current guard value is not required, the calculation load can be reduced.

Other Embodiments (a) In the above embodiments, the limiting process is implemented on both of the q-axis current command value Iq* and the d-axis current command value Id*. However, in the present disclosure, the limiting process may be implemented on at least one of the q-axis current command value Iq* and the d-axis current command value Id*. Depending on the above process, the current limit gain and the current guard value necessary for calculation of the limit value may be calculated for one of the q-axis current Iq and the d-axis current Id.

(b) In the above embodiments, after the voltage saturation amount V_sat is calculated by the voltage saturation amount calculation unit 41, the ratio rv of the voltage saturation amount V_sat and the target voltage saturation amount V_sat_tgt is calculated by the subsequent current limit gain calculation units 421 and 422. In another embodiment, a function unit including the functions of the voltage saturation amount calculation unit and the current limit gain calculation unit may be provided, and the ratio iv may be calculated directly on the basis of the q-axis voltage command value Vq** after saturation guard and the d-axis voltage command value Vd*.

(c) Another method of calculating the current limit gain without using the provisional value described in the above embodiments will be described with reference to FIG. 9.

Figure 9:
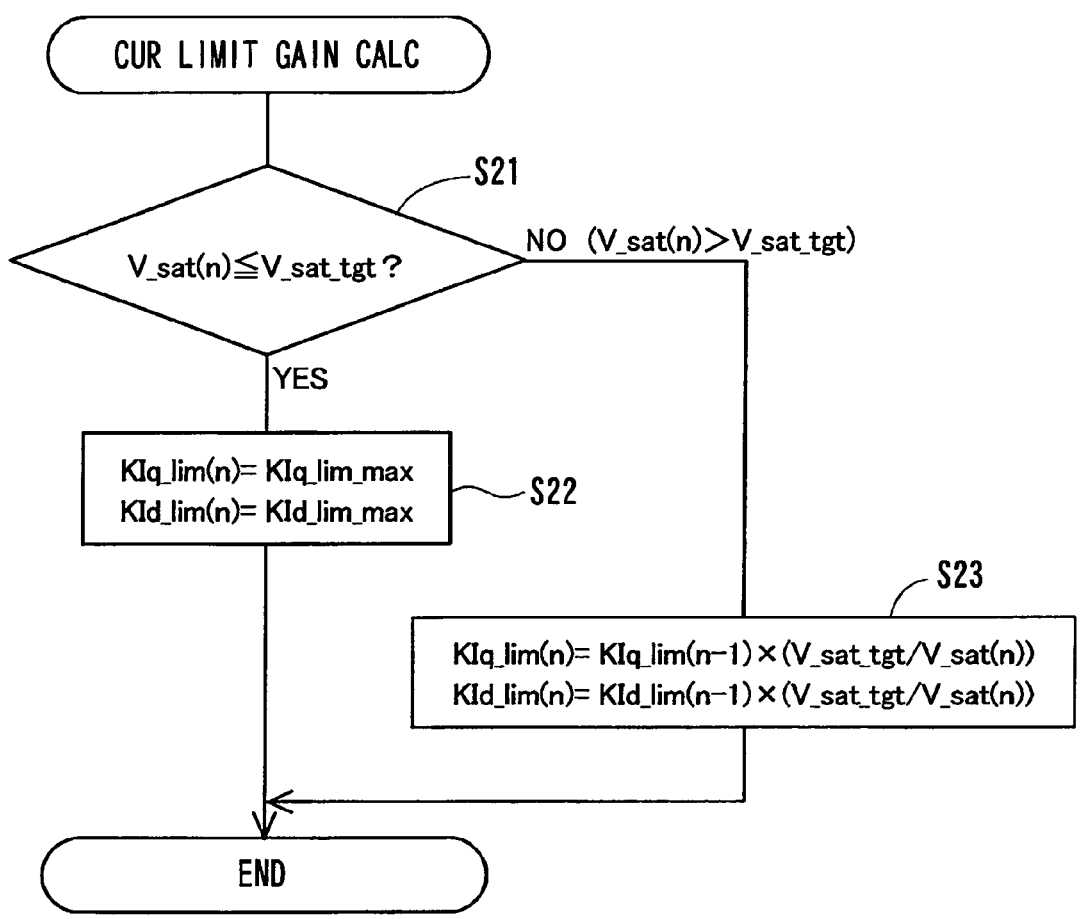
FIG. 9 is a flowchart of a current limit gain calculating process according to another embodiment.

In S21 of FIG. 9, the present value V_sat(n) of the voltage saturation amount is compared with the target voltage saturation amount V_sat_tgt. If the present value V_sat(n) of the voltage saturation amount is equal to or smaller than the target voltage saturation amount V_sat_tgt (yes in S21), the current limit gain maximum values KIq_lim_max and KId_lim_max are set as the current limit gains KIq_lim(n) and KId_lim(n) through Expression (9) in S22.

[Expression 9]

$$KIq\_lim(n) = KIq\_lim\_max$$

$$KId\_lim(n) = KId\_lim\_max \qquad (9)$$

On the other hand, if the present value V_sat(n) of the voltage saturation amount is larger than the target voltage saturation amount V_sat_tgt (no in S21), the current limit gains KIq_lim(n) and KId_lim(n) are calculated through Expression (10) in S23. Expression 10 corresponds to the replacement of the provisional values KIq_lim(n)_X and KId_lim(n)_X in Expression (2) corresponding to S2-1 in FIGS. 6 and 8 with the current limit gains KIq_lim(n) and KId_lim(n).

[Expression 10]

$$KIq\_lim(n) = KIq\_lim(n-1) \times \frac{V\_sat\_tgt}{V\_sat(n)} \qquad (10)$$

$$KId\_lim(n) = KId\_lim(n-1) \times \frac{V\_sat\_tgt}{V\_sat(n)}$$

(d) The motor control devices 101 and 102 according to the above embodiments include the LPFs 481, 482 or the LPFs 491, 492, and include Steps S4A and S4B of filtering the current guard value or the current limit gain in the current command value limiting process. When the sudden change of the current command values Iq* and Id* are not problematic, or when the control response is to be prioritized, no LPF is provided, and the filtering step may not be implemented in the current command value limiting process.

(e) In S5B of FIG. 8, the amount left without being limited in the generated current command values Iq* and Id* is calculated by the current limit gain. On the contrary, the amount limited in the current command values Iq* and Id* may be calculated, and subtracted from the current command values Iq* and Id*.

(f) The motor control device according to the present disclosure is not limited to the brushless motor for an electric power steering device, but may be applied to brushless motors of any other purposes. The motor control device according to the present disclosure can be also applied to multi-phase brushless motors of four or more phases without being limited to three phases.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control device for controlling energization of a multiphase brushless motor in a vector control manner, the motor control device comprising:
   a current command value generation unit that generates a q-axis current command value and a d-axis current command value;
   a controller that calculates a q-axis voltage command value and a d-axis voltage command value under a feedback control of the q-axis current command value and the d-axis current command value;
   a saturation guard unit that corrects at least one of the q-axis voltage command value and the d-axis voltage command value to set a magnitude of a voltage vector of the q-axis voltage command value and the d-axis voltage command value to be equal to or smaller than a predetermined voltage guard value; and
   a current command value limiting unit that limits at least one of the q-axis current command value and the d-axis current command value using one of a current limit gain and a current guard value, which are calculated based on a voltage saturation amount as the magnitude of the voltage vector of the q-axis voltage command value and the d-axis voltage command value corrected by the saturation guard unit, wherein:

the current command value limiting unit limits the at least one of the q-axis current command value and the d-axis current command value by setting the current guard value which is calculated by multiplying a rated current by the current limit gain, and a value which is obtained by inverting a plus-minus sign of the current guard value, to be a maximum value in a positive region and a minimum value in a negative region.

2. The motor control device according to claim 1, wherein:

the current command value limiting unit is configured by a multiplier; and the current command value limiting unit limits the at least one of the q-axis current command value and the d-axis current command value by multiplying the current limit gain.

3. The motor control device according to claim 1, further comprising:

a filter that removes a frequency component in a predetermined range of the current limit gain or the current guard value.

4. The motor control device according to claim 1, wherein: the current limit gain is determined by limiting the maximum value and the minimum value of a provisional value of the current limit gain, which is calculated based on a ratio between the voltage saturation amount and a target voltage saturation amount that is a target value of the voltage saturation amount.

* * * * *